United States Patent
Secker et al.

(10) Patent No.: US 9,211,832 B1
(45) Date of Patent: Dec. 15, 2015

(54) SALVAGE HOLD DOWN ATTACHMENT FOR EXCAVATORS

(71) Applicants: Paul D. Secker, Green Bay, WI (US); Shane T. Brunette, Sturgeon Bay, WI (US); Adam W. Lindley, Green Bay, WI (US); William L. Garfield, Green Bay, WI (US)

(72) Inventors: Paul D. Secker, Green Bay, WI (US); Shane T. Brunette, Sturgeon Bay, WI (US); Adam W. Lindley, Green Bay, WI (US); William L. Garfield, Green Bay, WI (US)

(73) Assignee: S.A.S. OF LUXEMBURG, LTD., Luxemburg, WI (US)

( * ) Notice: Subject to any disclaimer, the term of this patent is extended or adjusted under 35 U.S.C. 154(b) by 419 days.

(21) Appl. No.: 13/891,218

(22) Filed: May 10, 2013

Related U.S. Application Data

(60) Provisional application No. 61/647,688, filed on May 16, 2012.

(51) Int. Cl.
*B23Q 3/18* (2006.01)
*B60P 3/12* (2006.01)

(52) U.S. Cl.
CPC .............. *B60P 3/12* (2013.01); *Y10T 29/53283* (2015.01); *Y10T 29/53896* (2015.01)

(58) Field of Classification Search
USPC .......................................................... 269/58
See application file for complete search history.

(56) References Cited

U.S. PATENT DOCUMENTS

| | | | | |
|---|---|---|---|---|
| 3,685,128 A | | 8/1972 | Sharp et al. | |
| 3,885,292 A | * | 5/1975 | Sharp et al. ............ | B26D 3/005 157/13 |
| 3,900,073 A | * | 8/1975 | Crum .................... | E02F 3/7618 116/300 |
| 4,129,224 A | * | 12/1978 | Teach ........................ | E02F 3/30 37/348 |
| 4,198,747 A | * | 4/1980 | LaBounty ............... | E02F 3/965 30/134 |
| 4,290,193 A | * | 9/1981 | Anderton et al. ...... | H01R 43/26 29/278 |
| 4,537,259 A | * | 8/1985 | Funabashi et al. ...... | E02F 3/847 172/4.5 |
| 4,543,719 A | * | 10/1985 | Pardoe ................... | B23D 17/06 30/134 |
| 4,776,093 A | * | 10/1988 | Gross .................... | B23D 17/00 30/134 |
| 4,872,264 A | * | 10/1989 | LaBounty .............. | B23D 17/06 30/134 |
| 4,889,466 A | * | 12/1989 | Jindai et al. ............ | E02F 3/301 172/4.5 |

(Continued)

OTHER PUBLICATIONS

A Builtrite brouchure illustrating an Auto Dismantling Grapple.

*Primary Examiner* — Lee D Wilson
*Assistant Examiner* — Alvin Grant
(74) *Attorney, Agent, or Firm* — Donald J. Ersler

(57) ABSTRACT

A salvage hold down attachment for excavators preferably includes a pivot boom base and a pair of boom arms. The pivot boom base preferably includes a boom base, a bottom arm plate, a plurality of cylinder plates and an arm cross tube. The bottom arm plate is attached to the arm cross tube. First and second outer cylinder plates are attached to the first and second boom frame members. First and second inner cylinder plates are attached to the cross tube. Each boom arm preferably includes an arm tube, a plurality of staggered teeth and a front projection. Each boom arm is attached to the bottom arm plate and one of the boom frame members. The salvage hold down attachment for excavators is connected to an undercarriage dozer attachment bracket of an excavator and operated by the dozer controls of the excavator.

15 Claims, 10 Drawing Sheets

(56) References Cited

U.S. PATENT DOCUMENTS

| | | | | |
|---|---|---|---|---|
| 5,197,193 A * | 3/1993 | Smith | B23D 17/00 | 30/131 |
| 5,224,268 A * | 7/1993 | Pemberton | A62B 3/005 | 30/134 |
| 5,384,962 A * | 1/1995 | Pemberton | A62B 3/005 | 30/134 |
| 5,535,532 A * | 7/1996 | Fujii | E02F 3/437 | 172/4.5 |
| 5,715,615 A * | 2/1998 | Murakami | E02F 9/0891 | 180/69.21 |
| 5,832,729 A * | 11/1998 | Reid | E02F 3/325 | 60/421 |
| 5,848,485 A * | 12/1998 | Anderson | E02F 3/435 | 356/141.1 |
| 5,865,492 A * | 2/1999 | Horton | B66C 3/04 | 294/104 |
| 5,950,141 A * | 9/1999 | Yamamoto | E02F 3/845 | 701/469 |
| 6,016,616 A * | 1/2000 | Geelhoed | E02F 3/16 | 172/2 |
| 6,047,475 A * | 4/2000 | Tyrrell | E02F 3/965 | 241/101.73 |
| 6,068,060 A * | 5/2000 | Ohtomo | G01C 15/004 | 172/4.5 |
| 6,076,572 A * | 6/2000 | Cook | E02F 3/3604 | 144/24.12 |
| 6,119,970 A * | 9/2000 | LaBounty | B23D 17/00 | 241/101.73 |
| 6,122,598 A * | 9/2000 | Tanaka | E02F 3/308 | 299/30 |
| 6,209,232 B1 * | 4/2001 | Ono | E02F 3/435 | 37/348 |
| 6,263,595 B1 * | 7/2001 | Ake | E02F 9/26 | 356/141.1 |
| 6,571,693 B1 * | 6/2003 | Kaldenberg | B30B 9/32 | 100/215 |
| 6,892,918 B2 * | 5/2005 | Purser | B23D 17/06 | 225/103 |
| 6,926,217 B1 * | 8/2005 | LaBounty | B23D 17/00 | 241/101.73 |
| 7,051,912 B2 * | 5/2006 | Purser | B23D 17/00 | 225/103 |
| 7,216,575 B2 * | 5/2007 | Alseth | B23D 31/008 | 30/134 |
| 7,526,885 B2 * | 5/2009 | Peterson | E02F 3/404 | 144/4.1 |
| 8,308,092 B2 * | 11/2012 | Ramun | B23D 31/008 | 241/101.73 |
| 8,548,691 B2 * | 10/2013 | Hayashi | E02F 9/2029 | 172/4.5 |
| 8,634,991 B2 * | 1/2014 | Douglas | E02F 3/847 | 172/4.5 |
| 8,700,272 B2 * | 4/2014 | Stratton et al. | E02F 3/84 | 172/103 |
| 2006/0074578 A1 * | 4/2006 | Lueschow | G01G 19/083 | 702/101 |
| 2007/0124964 A1 * | 6/2007 | Wetzel | E02F 3/325 | 37/468 |
| 2009/0044434 A1 * | 2/2009 | Breuer | E02F 3/7613 | 37/410 |
| 2009/0229894 A1 * | 9/2009 | Roucka | B62D 49/0678 | 180/9.48 |

* cited by examiner

SALVAGE HOLD DOWN ATTACHMENT FOR EXCAVATORS

CROSS-REFERENCES TO RELATED APPLICATIONS

This is a nonprovisional patent application taking priority from provisional application No. 61/647,688 filed on May 16, 2012.

BACKGROUND OF THE INVENTION

1. Field of the Invention

The present invention relates generally to salvage of vehicles and more specifically to a salvage hold down attachment for excavators, which enables an excavator with an undercarriage dozer blade to be used for extracting parts from a vehicle.

2. Discussion of the Prior Art

U.S. Pat. No. 3,685,128 to Sharp et al. discloses a machine and method for removing engines from vehicles. Builtrite of Two Harbors, Minn. sells an auto dismantling grapple, which is used to extract parts from an automobile. It is common for excavators to be equipped with dozer blades. There is at least one company who will modify an excavator, so that a dozer blade may be mounted to the excavator. Retrofiting an excavator to attach a dozer blade is an extensive installation process, including welding and fabrication an undercarriage of the excavator.

Applicant's invention focuses solely on excavators that are equipped with a dozer blade from the factory. Applicant's invention utilizes the existing dozer blade bracket. Applicant's invention may be installed in a few hours by removing the pins that mount the existing dozer blade and reinserting the pins into applicant's salvage hold down attachment.

Accordingly, there is a clearly felt need in the art for a salvage hold down attachment for excavators, which enables an existing dozer blade to be removed and the salvage hold down attachment to be installed by the removal and installation of pins, and a grapple attachment secured to a boom or stick of the excavator.

SUMMARY OF THE INVENTION

The present invention provides a salvage hold down attachment for excavators, which enables an excavator with an undercarriage dozer blade to be used for extracting parts from a vehicle. The salvage hold down attachment for excavators (excavator hold down attachment) preferably includes a pivot boom base and a pair of boom arms. The pivot boom base preferably includes a boom base, a bottom arm plate, two outer cylinder plates, two inner cylinder plates and an arm cross tube. The boom base includes two boom frame members, a cross tube, two hinge plates and two arm ribs. A first boom frame member is attached to a first end of the cross tube and a second boom frame member is attached to a second end of the cross tube. The first hinge plate is attached to the first boom frame member and the second hinge plate is attached to the second boom frame member.

The first arm rib is attached to the first boom frame member and the second arm rib is attached to the second boom frame member. The first boom frame member is attached to a first end of the arm cross tube and the second boom frame member is attached to a second end of the arm cross tube. The bottom arm plate is attached to the first and second arm ribs and to the arm cross tube. The first outer cylinder plate is attached to the first boom frame member and the second outer cylinder plate is attached to the second boom frame member. The first inner cylinder plate is attached to the cross tube and the second inner cylinder plate is attached to the cross tube.

Each boom arm preferably includes an arm tube, a plurality of staggered teeth and a front projection. A bottom of the first boom arm is attached to the bottom arm plate and to the first boom frame member. The second boom arm is attached to the bottom arm plate and to the second boom frame member. A top arm plate is attached to the first boom arm, the second boom arm and the arm cross tube. Once the excavator hold down attachment is pivotally secured to the undercarriage dozer attachment bracket, the excavator hold down attachment is operated by the dozer controls of the excavator.

Accordingly, it is an object of the present invention to provide an excavator hold down attachment, the excavator hold down attachment is installed by the removal and installation of pins in the existing dozer blade bracket, and a grapple attachment secured to a boom or stick of the excavator.

These and additional objects, advantages, features and benefits of the present invention will become apparent from the following specification.

DETAILED DESCRIPTION OF THE PREFERRED EMBODIMENTS

Figure 1:
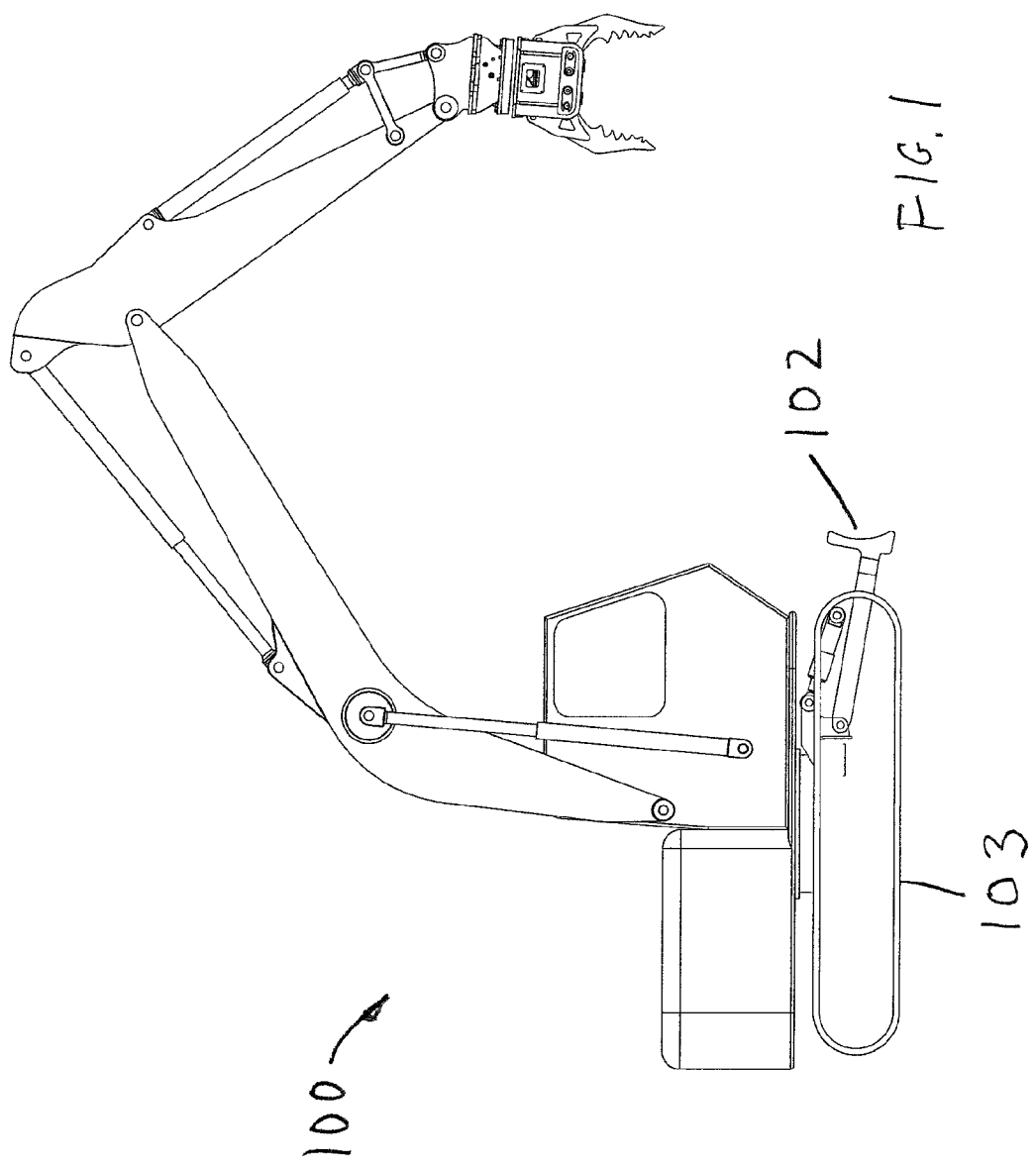
FIG. 1 is a side view of an excavator with an undercarriage dozer blade attached thereto.
Figure 2:
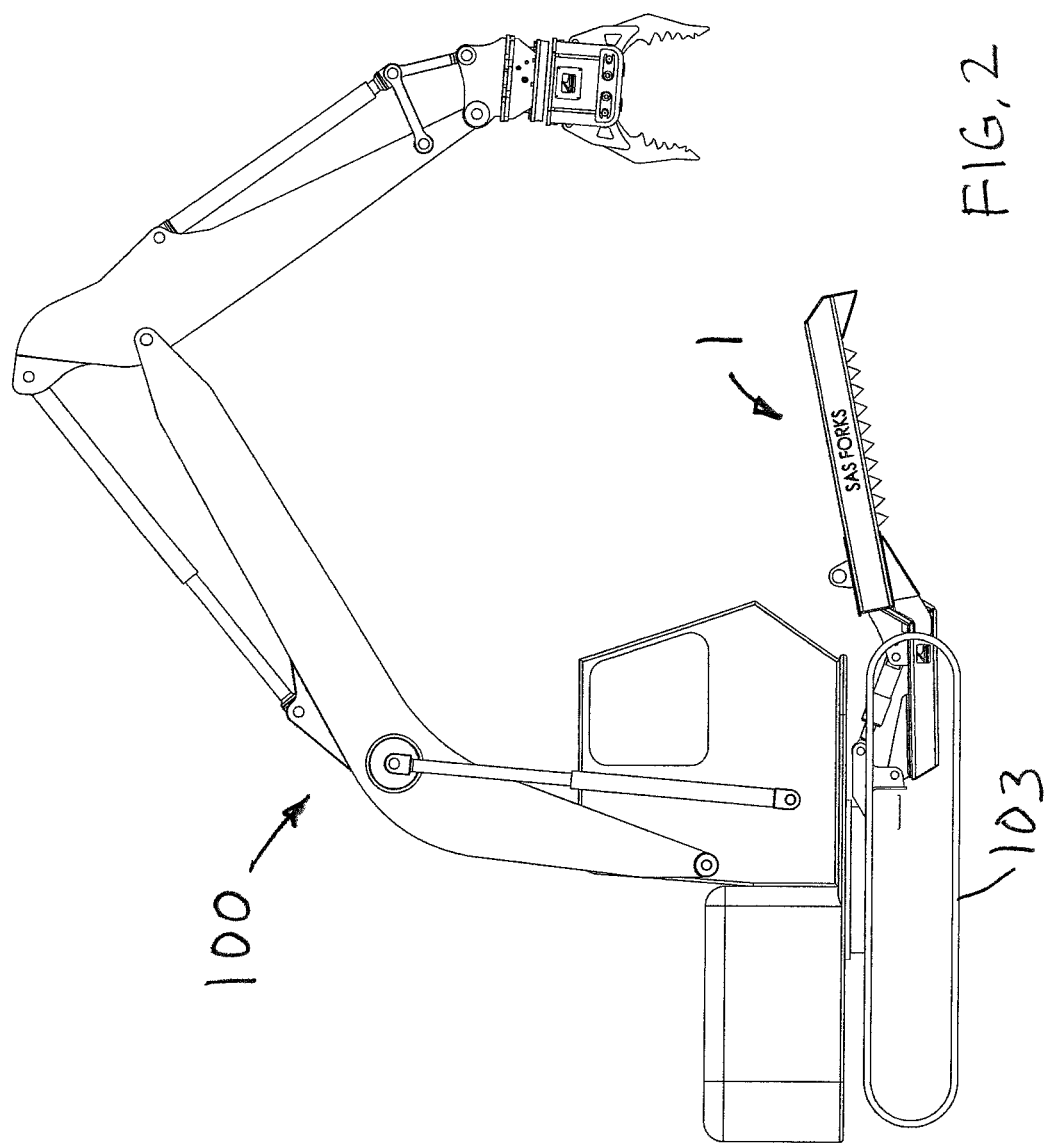
FIG. 2 is a side view of an excavator with an excavator hold down attachment in accordance with the present invention.
Figure 3:
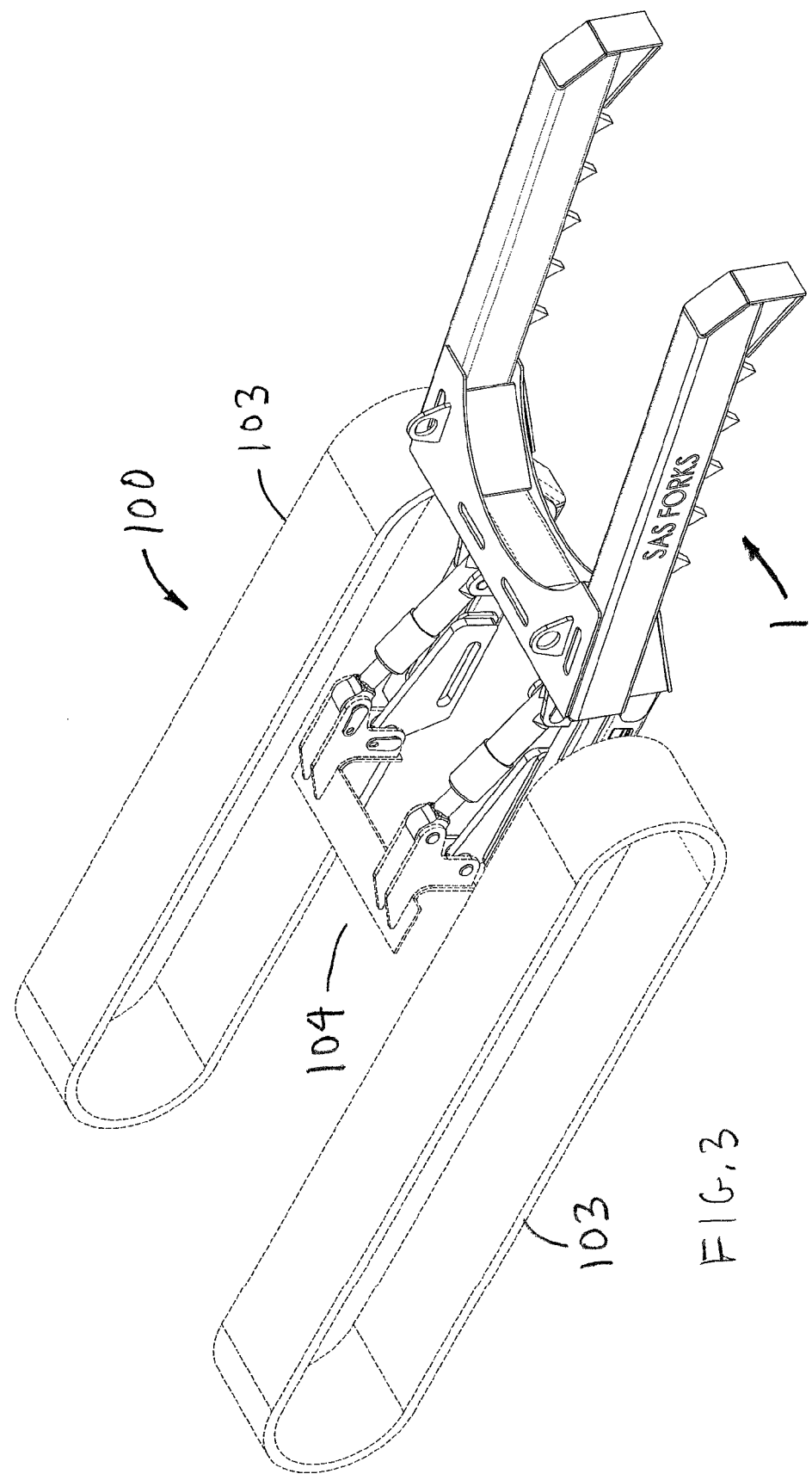
FIG. 3 is an enlarged perspective view of an excavator hold down attachment pivotally retained between tracks of an excavator in accordance with the present invention.
Figure 4:
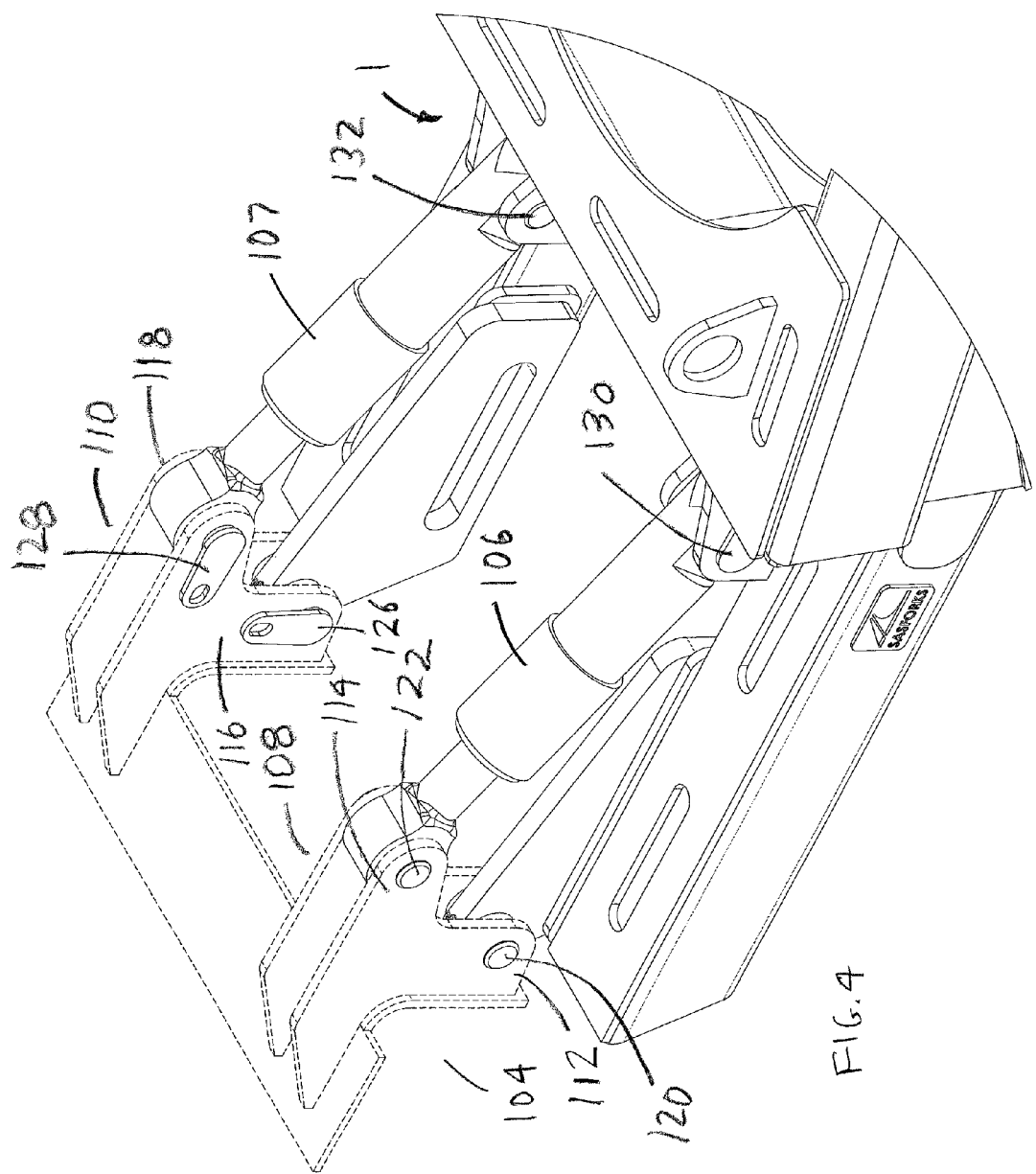
FIG. 4 is an enlarged perspective view of an undercarriage dozer attachment bracket pivotally secured to an end of an excavator hold down attachment in accordance with the present invention.
Figure 5:
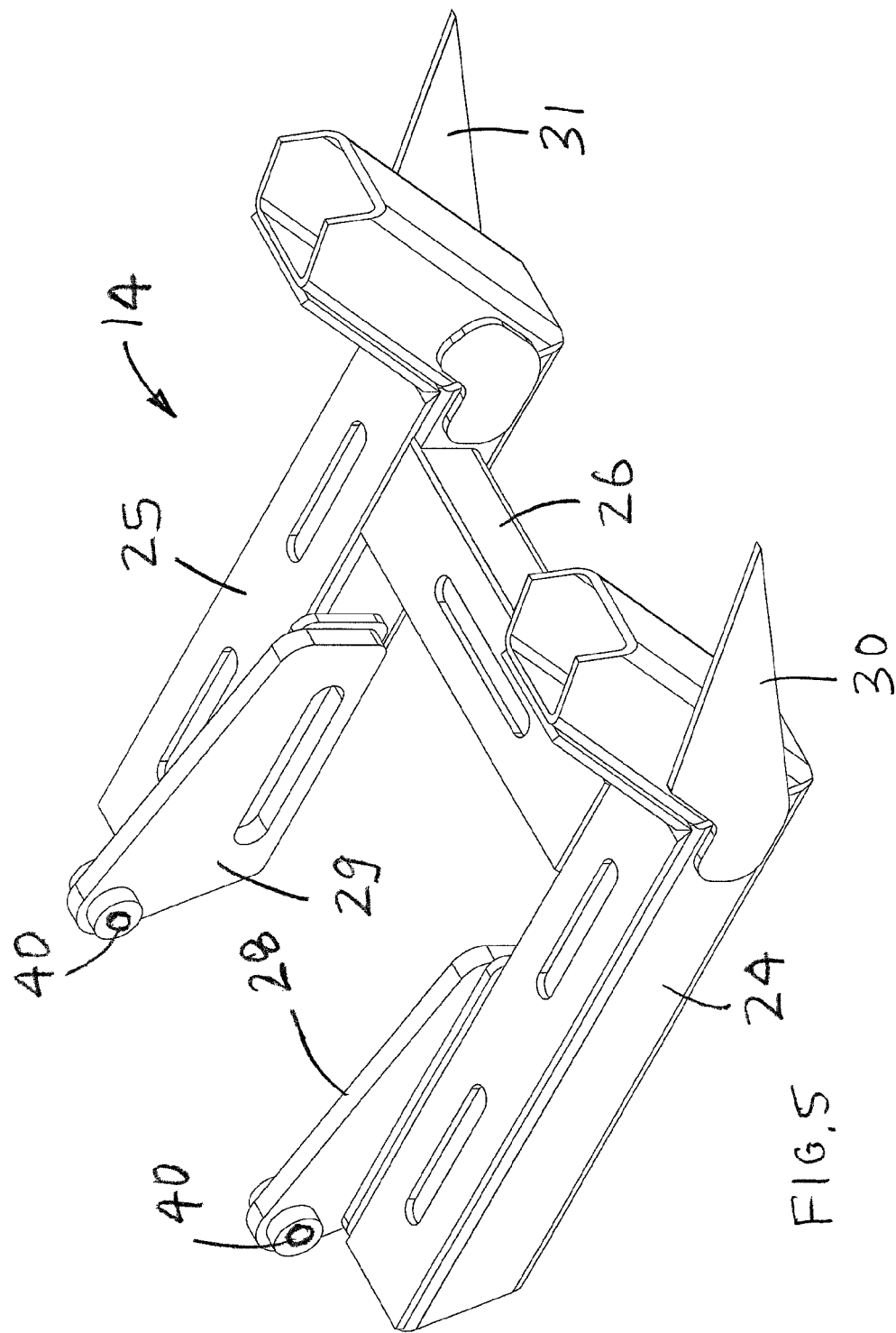
FIG. 5 is a perspective view of a boom base of an excavator hold down attachment in accordance with the present invention.
Figure 6:
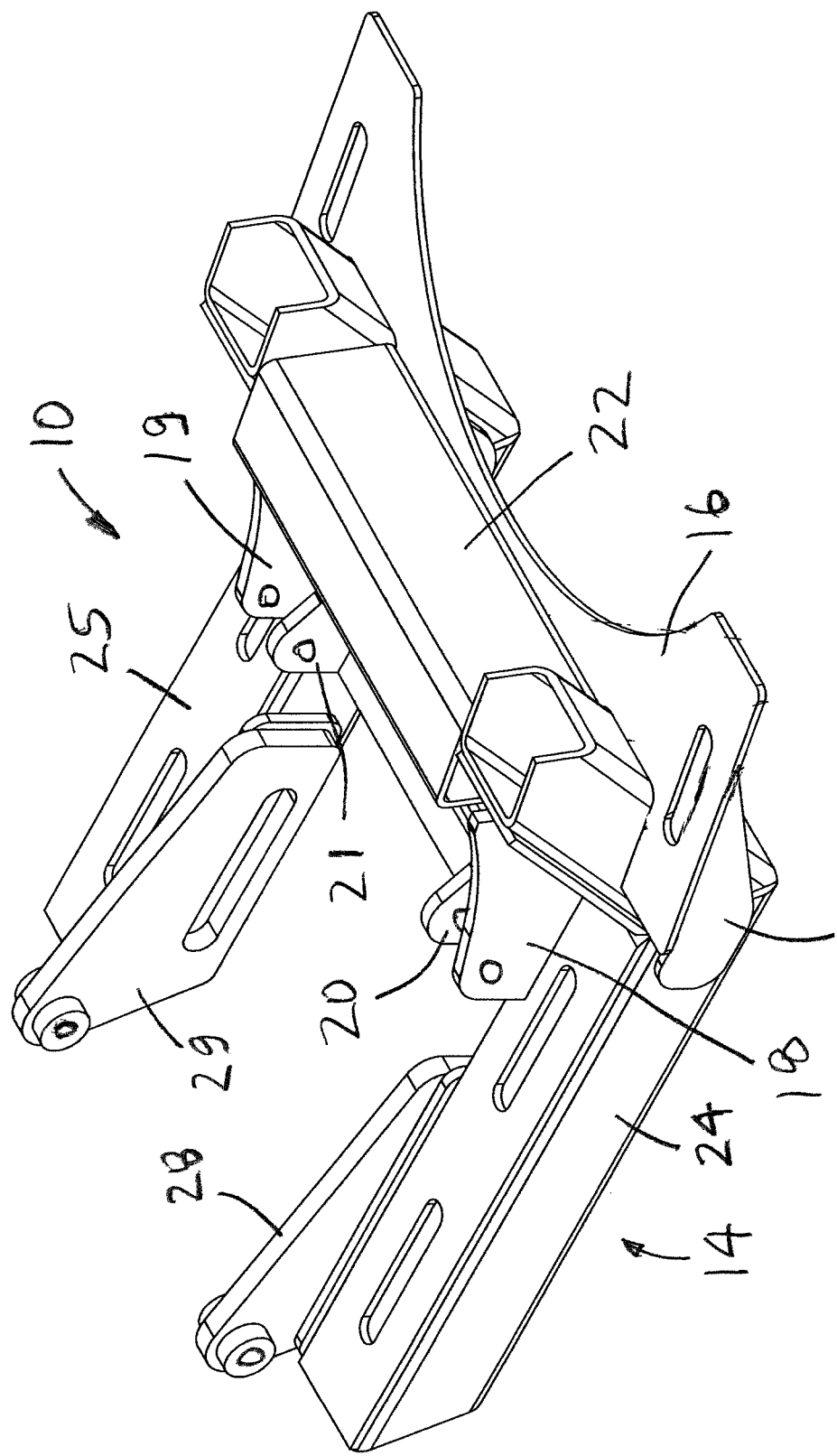
FIG. 6 is a perspective view of a pivot boom base of an excavator hold down attachment in accordance with the present invention.
Figure 7:
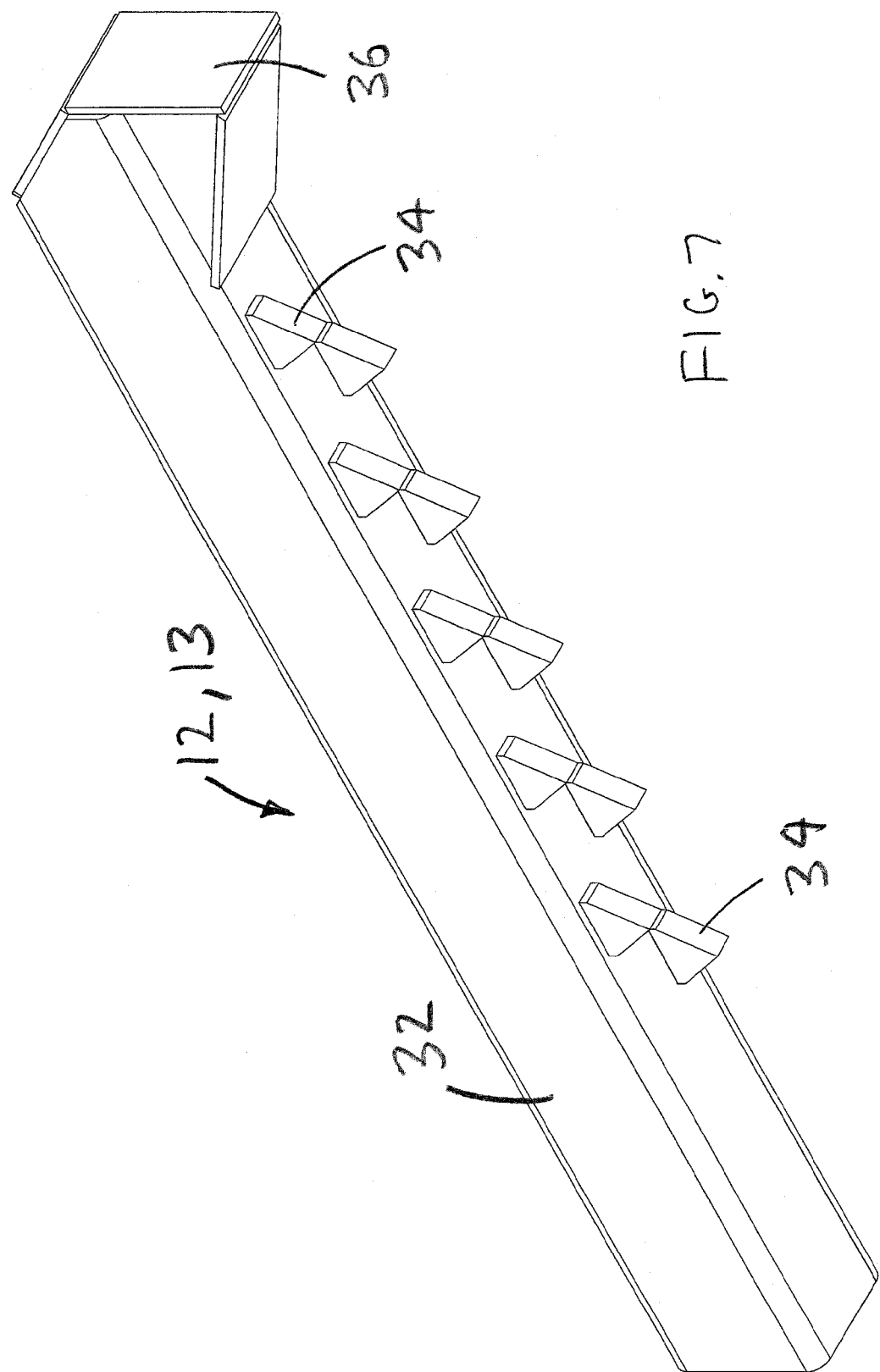
FIG. 7 is a bottom perspective view of a boom arm of an excavator hold down attachment in accordance with the present invention.
Figure 8:
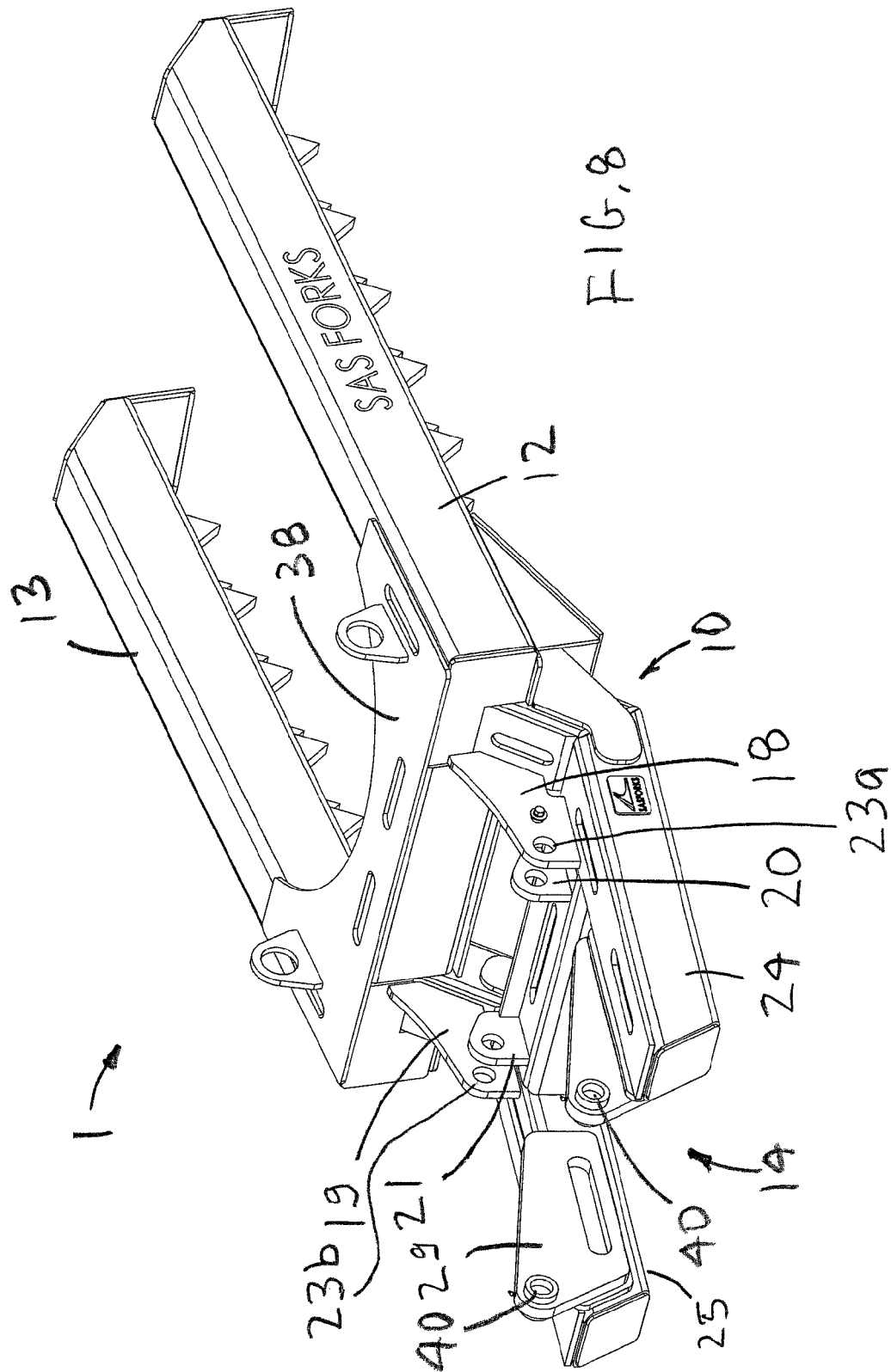
FIG. 8 is a rear perspective view of an excavator hold down attachment in accordance with the present invention.

With reference now to the drawings, and particularly to FIG. 2, there is shown a side view of an excavator 100 with an excavator hold down attachment 1. With reference to FIG. 1, the excavator 100 includes an undercarriage dozer blade 102 and a pair tracks 103. With reference to FIGS. 3-4, the excavator 100 includes an undercarriage dozer attachment bracket 104, located between the pair of tracks 103. With reference to FIGS. 5-8, the excavator hold down attachment 1 preferably includes a pivot boom base 10 and a pair of boom arms 12, 13. The pivot boom base 10 preferably includes a boom base 14, a bottom arm plate 16, two outer cylinder plates 18, 19, two inner cylinder plates 20, 21, an arm cross tube 22. The boom base 14 includes two boom frame members 24, 25 a cross tube 26, two hinge plates 28, 29 and two arm ribs 30, 31. The first and second boom frame members are substantially L-shaped. The first boom frame member 24 is attached to a first end of the cross tube 26 and the second boom frame member 25 is attached to a second end of the cross tube 26 at substantially a front of the first and second boom frame members. The first hinge plate 28 is attached to an inside surface of the first boom frame member 24 at a rear thereof and the second hinge plate 29 is attached an inside surface of the second boom frame member 25 at a rear thereof.

The first arm rib 30 is attached to a front of the first boom frame member 24 and the second arm rib 31 is attached to a front of the second boom frame member 25. An inside surface of the first boom frame member 24 at a front thereof is attached to a first end of the arm cross tube 26 and an inside surface of the second boom frame member 25 is attached at a front thereof to a second end of the arm cross tube 26. The bottom arm plate 16 is attached to the first and second arm ribs and to the arm cross tube 22. A bottom of the first outer cylinder plate 18 is attached to the first boom frame member 24 and a bottom of the second outer cylinder plate 19 is attached to the second boom frame member 25. A bottom of the first inner cylinder plate 20 is attached to a top of the cross tube 26 and a bottom of the second inner cylinder plate 21 is attached to a top of the cross tube 26. A first pin bore 23 is formed through the first inner and outer cylinder plates. A second pin bore 25 is formed through the second inner and outer cylinder plates. The inner and outer cylinder plates are positioned, such that first and second cylinders 106, 107 of the excavator 100 may be pivotally attached thereto. The cylinders 106 and 107 are preferably hydraulic cylinders, but any suitable linear actuation device may also be used.

Each boom arm 12, 13 preferably includes an arm tube 32, a plurality of staggered teeth 34 and a front projection 36. The plurality of staggered teeth 34 are attached to a bottom of the arm tube 32. The front projection 36 is attached to a front of the arm tube 32. A bottom of the first boom arm 12 at a rear thereof is attached to the bottom arm plate 16 and a side of the first boom frame member 24. A bottom of the second boom arm 13 at a rear thereof is attached to the bottom arm plate 16 and a side of the second boom frame member 25. A top arm plate 38 is attached to the first boom arm 12, the second boom arm 13 and the arm cross tube 22. Each hinge plate 28, 29 include a pin bore 40.

With reference to FIG. 4, the undercarriage dozer attachment bracket 104 includes a first pivot bracket 108 and a second bracket 110. The first pivot bracket 108 includes a first hinge pivot arm 112 and a first cylinder pivot arm 114. The second pivot bracket 110 includes a second hinge pivot arm 116 and a second cylinder pivot arm 118. The first hinge pivot arm 112 is pivotally connected to the first hinge plate 28 with a pin 120. The first cylinder pivot arm 114 is pivotally connected to one end of the first cylinder 106 with a pin 122. The second hinge pivot arm 116 is pivotally connected to the second hinge plate 29 with a pin 126. The second cylinder pivot arm 118 is pivotally connected to one end of the second cylinder 107 with a pin 128.

Figure 9:
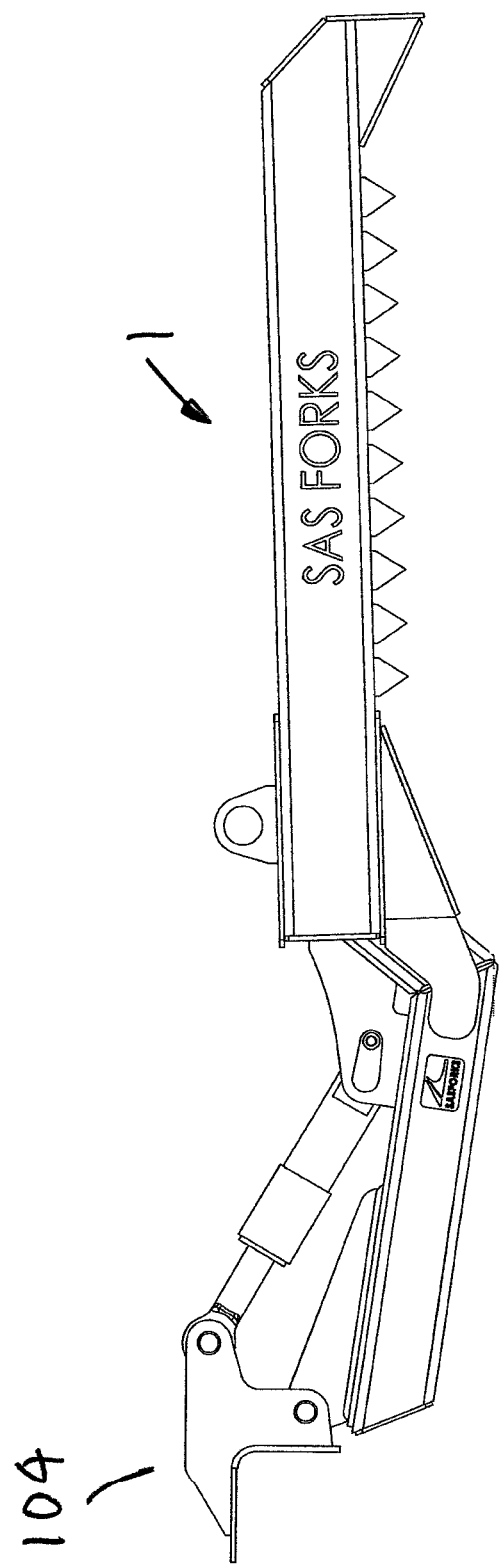
FIG. 9 is a side view of an excavator hold down attachment in a lowered orientation in accordance with the present invention.
Figure 10:
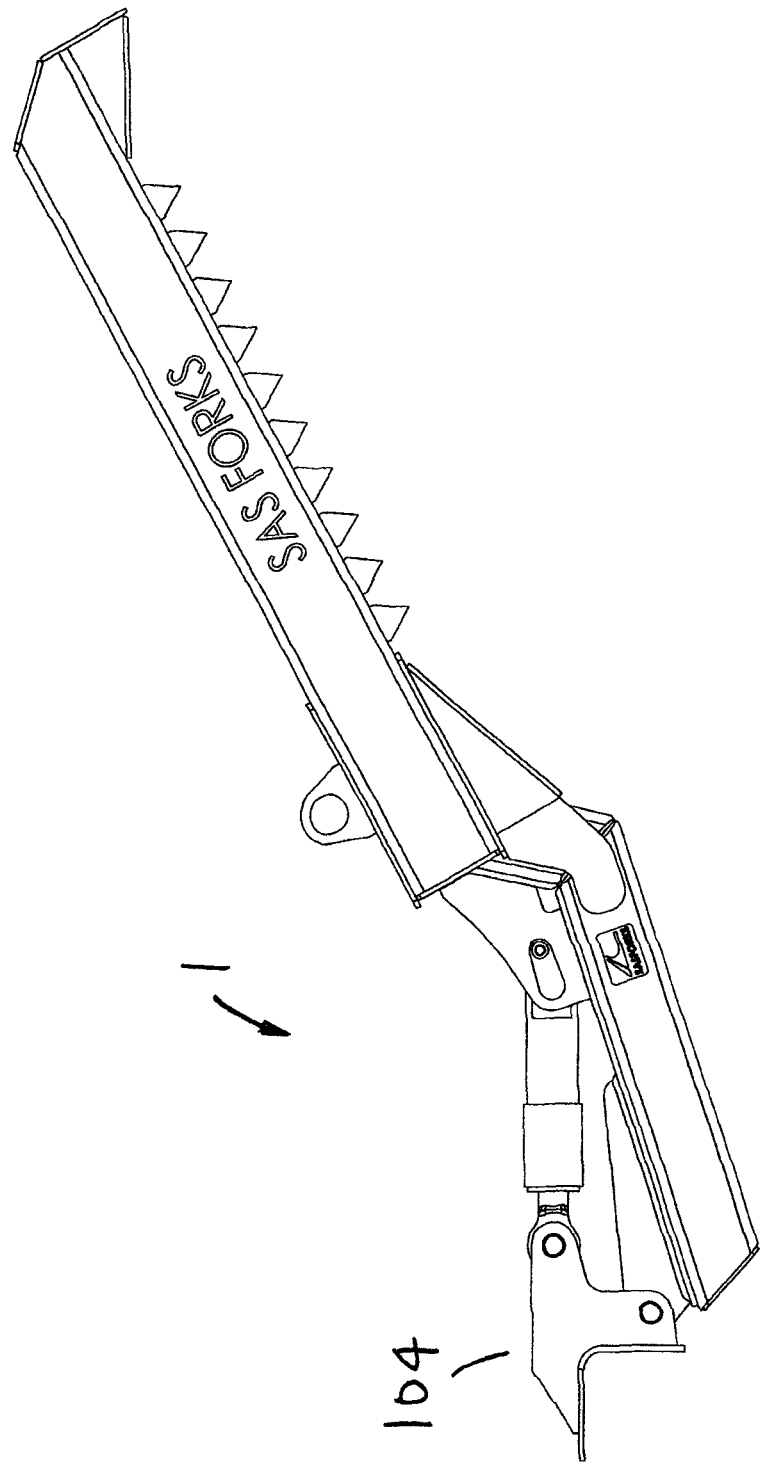
FIG. 10 is a side view of an excavator hold down attachment in a raised orientation in accordance with the present invention.

The other end of the first cylinder 106 is pivotally connected to the first inner and outer plates with a pin 130. The other end of the second cylinder 107 is pivotally connected to the first inner and outer plates with a pin 132. Once the excavator hold down attachment 1 is pivotally secured to the undercarriage dozer attachment bracket 104, the excavator hold down attachment 1 is operated by the dozer controls of the excavator 100. With reference to FIGS. 9-10, the excavator hold down attachment 1 includes a raised orientation and a lower orientation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An excavator hold down attachment for use by an excavator with an undercarriage dozer attachment bracket, comprising:
    a first boom arm and a second boom arm, each one of said boom arms includes an arm tube, a plurality of staggered teeth and a front projection; and
    a boom base, said first boom arm extends from one end of said boom base on a first side thereof, said second boom arm extends from said one end of said boom base on a second side thereof, wherein an undercarriage dozer attachment bracket is pivotally secured to an opposing end of said boom base, a linear actuation device is pivotally connected to said boom base and the undercarriage dozer attachment bracket, a second linear actuation device is pivotally connected to said boom base and the undercarriage dozer attachment bracket.

2. The excavator hold down attachment for use by an excavator with an undercarriage dozer attachment bracket of claim 1 wherein:
    said boom base includes a first boom frame member, a second bottom frame member, a cross tube and a first hinge plate and a second hinge plate.

3. The excavator hold down attachment for use by an excavator with an undercarriage dozer attachment bracket of claim 2 wherein:
    said first boom frame member is attached to a first end of said cross tube, said second boom frame member is attached to a second end of said cross tube, said first hinge plate is attached to said first boom frame member, said second hinge plate is attached to said second boom frame member.

4. The excavator hold down attachment for use by an excavator with an undercarriage dozer attachment bracket of claim 3, further comprising:
    an arm cross tube attached between said first and second boom frame members.

5. The excavator hold down attachment for use by an excavator with an undercarriage dozer attachment bracket of claim 4, further comprising:
    a bottom arm plate attached to said arm cross tube, said first frame member and said second boom frame member.

6. The excavator hold down attachment for use by an excavator with an undercarriage dozer attachment bracket of claim 4, further comprising:
    a first outer cylinder plate attached to said first boom frame member, a second outer cylinder plate attached to said second boom frame member, two inner cylinder plates attached to said cross tube.

7. An excavator hold down attachment for use by an excavator with an undercarriage dozer attachment bracket, comprising:
    a first boom arm and a second boom arm, each one of said boom arms includes an arm tube and a plurality of staggered teeth;
    a boom, said first boom arm extends from one end of said boom base on a first side thereof, said second boom arm extends from said one end of said boom base on a second side thereof, wherein an undercarriage dozer attachment bracket is pivotally secured to an opposing end of said boom base, a linear actuation device is pivotally connected to said boom base and the undercarriage dozer attachment bracket, a second linear actuation device is pivotally connected to said boom base and the undercarriage dozer attachment bracket.

8. The excavator hold down attachment for use by an excavator with an undercarriage dozer attachment bracket of claim 7, further comprising:

each one of said boom arms includes a front projection.

9. An excavator hold down attachment for use by an excavator with an undercarriage dozer attachment bracket, comprising:

a first boom arm and a second boom arm, each one of said boom arms includes an arm tube and a plurality of staggered teeth;

a boom base includes a first boom frame member, a second bottom frame member, a cross tube and a first hinge plate and a second hinge plate, said first boom arm extends from one end of said boom base on a first side thereof, said second boom arm extends from said one end of said boom base on a second side thereof, wherein an undercarriage dozer attachment bracket is pivotally secured to an opposing end of said boom base, a linear actuation device is pivotally connected to said boom base and the undercarriage dozer attachment bracket, a second linear actuation device is pivotally connected to said boom base and the undercarriage dozer attachment bracket.

10. The excavator hold down attachment for use by an excavator with an undercarriage dozer attachment bracket of claim 9, further comprising:

said boom base includes a first boom frame member, a second bottom frame member, a cross tube and a first hinge plate and a second hinge plate.

11. The excavator hold down attachment for use by an excavator with an undercarriage dozer attachment bracket of claim 10 wherein:

said first boom frame member is attached to a first end of said cross tube, said second boom frame member is attached to a second end of said cross tube, said first hinge plate is attached to said first boom frame member, said second hinge plate is attached to said second boom frame member.

12. The excavator hold down attachment for use by an excavator with an undercarriage dozer attachment bracket of claim 11, further comprising:

an arm cross tube attached between said first and second boom frame members.

13. The excavator hold down attachment for use by an excavator with an undercarriage dozer attachment bracket of claim 12, further comprising:

a bottom arm plate attached to said arm cross tube, said first frame member and said second boom frame member.

14. The excavator hold down attachment for use by an excavator with an undercarriage dozer attachment bracket of claim 12, further comprising:

a first outer cylinder plate is attached to said first boom frame member, a second outer cylinder plate is attached to said second boom frame member, two inner cylinder plates are attached to said cross tube.

15. The excavator hold down attachment for use by an excavator with an undercarriage dozer attachment bracket of claim 9, further comprising:

each one of said boom arms includes a front projection.

* * * * *